US012625915B1

(12) United States Patent
Ginotra et al.

(10) Patent No.: US 12,625,915 B1
(45) Date of Patent: May 12, 2026

(54) GENERATING UNIVERSAL WEB PROFILES FROM DIVERSE EVENT DATA USING GENERATIVE ARTIFICIAL INTELLIGENCE (AI) MODELS

(71) Applicant: Microsoft Technology Licensing, LLC, Redmond, WA (US)

(72) Inventors: Kamal Ginotra, Kirkland, WA (US); Nabeel Kaushal, Seattle, WA (US); Dongfei Yu, Vancouver (CA); Sedigheh Zolaktaf, Vancouver (CA); Andrew James McNamara, Belwood (CA); Jikun Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/006,801

(22) Filed: Dec. 31, 2024

(51) Int. Cl.
    *G06F 16/9535*     (2019.01)
    *G06F 40/30*     (2020.01)

(52) U.S. Cl.
    CPC .......... *G06F 16/9535* (2019.01); *G06F 40/30* (2020.01)

(58) Field of Classification Search
    CPC ............................. G06F 16/9535; G06F 40/30
    See application file for complete search history.

(56) References Cited

U.S. PATENT DOCUMENTS

| | | | | |
|---|---|---|---|---|
| 2025/0005050 | A1* | 1/2025 | Krishnan | G06F 16/243 |
| 2025/0209266 | A1* | 6/2025 | Lu | G06F 40/40 |
| 2025/0278563 | A1* | 9/2025 | Yan | G06F 40/279 |

* cited by examiner

*Primary Examiner* — Etienne P Leroux
*Assistant Examiner* — Oscar Wehovz
(74) *Attorney, Agent, or Firm* — Ray Quinney & Nebeker P.C.; Christopher K. Hallstrom

(57) ABSTRACT

A universal user web profile generation system is provided that utilizes one or more generative artificial intelligence (AI) models to generate universal web profiles for users. For example, the universal user web profile generation system uses a combination of neural networks and generative AI models to distill relevant information from the vast amounts and types of user event data and generate relevant universal user event taxonomies. Upon generating the universal user event taxonomies, the universal user web profile generation system can efficiently and accurately generate user profiles based on user web data that aligns with the universal user event taxonomies, ensuring profile compatibility with most or all downstream processes and services that access the user web profiles. Indeed, the universal user web profile generation system generates universal web profiles for users by consolidating extensive user data into a concise and insightful format.

20 Claims, 9 Drawing Sheets

100

900

GENERATING UNIVERSAL WEB PROFILES FROM DIVERSE EVENT DATA USING GENERATIVE ARTIFICIAL INTELLIGENCE (AI) MODELS

BACKGROUND

Recent years have seen significant growth in both hardware and software within the field of content discovery systems. These systems, which provide personalized content to users, have become integral to enhancing user experiences across various digital platforms. Typically, they leverage algorithms that analyze user data to predict and deliver content tailored to individual preferences. However, despite advancements in machine learning and data processing techniques, current content discovery systems still face several technical shortcomings. For example, the sheer volume and diversity of available data are too vast to process effectively. Current systems are unable to scale to fully utilize this data, often relying on only a fraction of it. This results in inefficiencies and inconsistencies. These problems are further exacerbated when incomplete and inaccurate data are provided to downstream services. These issues, along with others described below, underscore the urgent need for improvements in both efficiency and accuracy within current content discovery systems.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
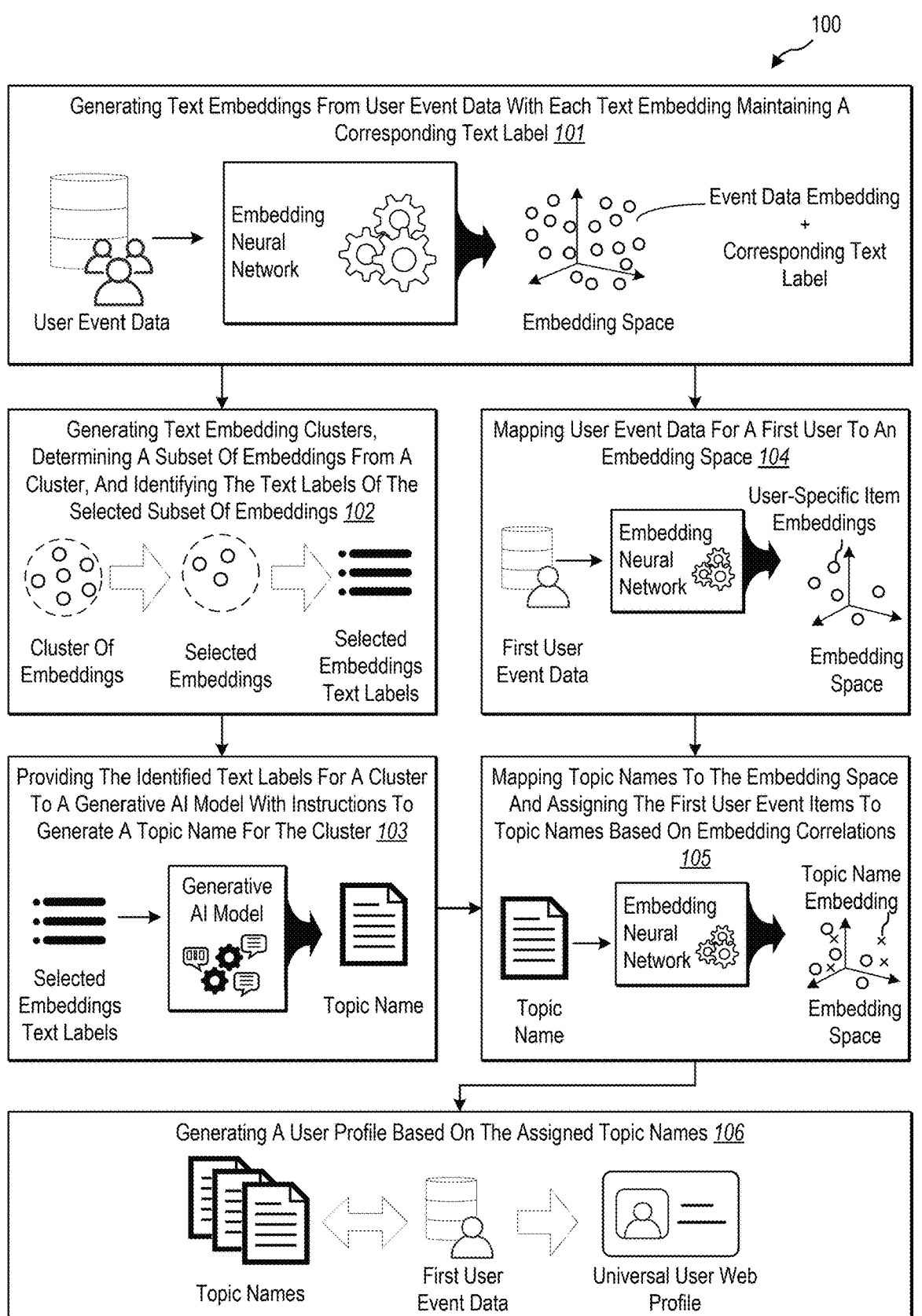
FIG. 1 illustrates an example overview of implementing a profile generation system that uses a generative artificial intelligence (AI) model to determine topic names from event data for generating universal user web profiles.

This disclosure describes a universal user web profile generation system (profile generation system for short) that utilizes one or more generative artificial intelligence (AI) models to generate universal web profiles for users. For example, the profile generation system uses a combination of neural networks and generative AI models to distill relevant information from the vast amounts and types of user event data and generate relevant universal user event taxonomies. Upon generating the universal user event taxonomies, the profile generation system can efficiently and accurately generate user profiles based on user web data that aligns with the universal user event taxonomies, which ensures profile compatibility with most or all downstream processes and services that access the user web profiles. Indeed, the profile generation system generates universal web profiles for users by consolidating extensive user data into a concise and insightful format.

To illustrate, in various implementations, the profile generation system determines topic names from event data using one or more generative AI models by obtaining event data associated with users, which may include data of various types, and pieces of event data can include one or more text labels. The profile generation system can convert the event data into an embedding space, assigning corresponding text labels to respective embeddings. In addition, the profile generation system may generate embedding clusters and identify text labels from some or all of the embeddings in the cluster. Then, the profile generation system provides a prompt to a generative AI model to generate a topic name for the cluster based on the identified text labels.

In additional implementations, the profile generation system identifies the event data associated with a first user. The profile generation system assigns each piece of the identified event data to one of the curated topic names generated based on the event data from multiple users by correlating the event data for the first user with topic names in an embedding space. The profile generation system may further score and rank the assigned topic names before generating or updating a user web profile with the selected assigned topic names.

Indeed, implementations of the present disclosure provide benefits and solve various problems in the art with systems, computer-readable media, and computer-implemented methods that allow for efficiently generating user web profiles, even on a large scale, while maintaining consistency, accuracy, and compatibility. In particular, the profile generation system utilizes various machine learning models, including a generative AI model, to efficiently, accurately, and flexibly create universal user web profiles.

As mentioned above, current content discovery systems suffer from several technical shortcomings that hinder their effectiveness. A significant issue is the inability to process large volumes of diverse data types while maintaining a consistent and standardized topic taxonomy. As a result, each downstream process or service that includes content distribution based on user recommendations must generate its own user profiles, which is inefficient and inconsistent, or use potentially incompatible user profiles. This further exacerbates the industry problem of recommending personalized content to users based on their interests.

In contrast to existing systems, as described in this disclosure, the profile generation system delivers several significant technical benefits in terms of computing accuracy, efficiency, and compatibility. Moreover, the profile generation system provides several practical applications that address problems related to accurately and efficiently generating universal web profiles for users using multiple machine learning models, including generative AI models.

To illustrate, the profile generation system improves computational efficiency and accuracy by generating a standardized topic taxonomy. Indeed, the profile generation system can map event data from various data sources to a common list of curated topics. Additionally, data associated with specific users can be correlated and assigned among the list of curated topics within a web profile for the user, which provides profile compatibility with downstream processes and services.

In particular, by using a generative AI model to generate topic names from user event data, the profile generation system improves computational efficiency by using a standardized base of topic names when assigning user data within profiles. By doing so, the profile generation system consolidates extensive user data into a concise, insightful, and compatible format. Additionally, by using a generative AI model to generate the topic names, the profile generation system enables key patterns and trends in user behavior to be identified, making the data more usable for various applications.

In various implementations, by generating embeddings from the text labels of event data, the profile generation system enables more information to be utilized in generating the topic taxonomy. For example, current generative AI models are constrained by token limits and processing capabilities. Because of the vast amount of event data available, directly processing the data with a generative AI model would be prohibitive and infeasible. Accordingly, by generating embeddings from event data and using associated text labels, the profile generation system allows computing devices to efficiently generate topic names from the event data.

Furthermore, by using embeddings, the profile generation system enables computing devices to flexibly scale operations to process billions or more pieces of event data. In addition, by utilizing multiple embedding neural networks trained for different event data types (or multimodal embedding neural networks), the profile generation system flexibly allows event data of various types to be mapped to a common embedding space, providing corresponding text labels to the generative AI model for topic name generation.

The profile generation system provides additional benefits in terms of computational efficiency, accuracy, and flexibility. For example, the profile generation system uses embedding mapping and a generative AI model to remove duplicate topic names and improve topic names for a group of semantically related topics. By doing so, the profile generation system reduces the amount of processing required to generate universal web profiles for users, as the number of topics in the topic taxonomy is reduced in size (sometimes as much as 30%). As another example, by providing a standardized topic taxonomy across universal web profiles, the profile generation system enhances computational efficiency and accuracy across services that access services that access the web by streamlining their processes to handle a single, compatible user profile data format.

As illustrated in the foregoing discussion, this disclosure utilizes a variety of example terms to describe the features and advantages of one or more implementations. For instance, this disclosure describes the profile generation system in the context of a cloud computing system. As an example, the term "cloud computing system" refers to a network of interconnected computing devices that provide various services and applications to computing devices (e.g., server devices and client devices) inside or outside of the cloud computing system. While various components are described as belonging to a cloud computing system, in some implementations, one or more components may be located outside of the cloud computing system. Additional terms are defined throughout the document in different examples and contexts.

As an example, the term "machine-learning model" refers to a computer model or computer representation that can be trained (e.g., optimized) based on inputs to approximate unknown functions. For instance, a machine-learning model can include (but is not limited to) an autoencoder model, an embedding model, a classification model, a neural network, a decision tree (e.g., a gradient-boosted decision tree), a linear regression model, a logistic regression model, or a combination of these models.

As another example, the term "neural network" refers to a machine learning model made up of interconnected artificial neurons that communicate and learn to approximate complex functions. Neural networks generate outputs based on multiple inputs provided to the model. For instance, a neural network includes an algorithm (or set of algorithms) that uses deep learning techniques and training data to adjust the parameters of the network and model high-level abstractions in data. Compared to generative AI models, machine learning models and neural networks use fewer parameters and are more computationally efficient. There are various types of neural networks, including transformer-based neural networks, convolutional neural networks (CNNs), embedding neural networks, residual learning neural networks, recurrent neural networks (RNNs), generative neural networks, generative adversarial neural networks (GANs), and single-shot detection (SSD) networks.

As an example, the term "generative artificial intelligence model" (or "generative AI model") refers to an artificial intelligence computational system that utilizes deep learning and a large number of parameters (e.g., in the billions or trillions for a large version and fewer for a small version) that are trained on one or more extensive datasets to produce coherent, contextually relevant, and fluent topic-specific outputs (e.g., text and/or images). In many instances, a generative AI model refers to an advanced computational system that uses natural language processing, machine learning, and/or image processing to generate coherent and contextually relevant human-like responses.

Generative AI models have applications in natural language understanding, content generation, text summarization, dialogue systems, language translation, creative writing assistance, image generation, audio generation, and more. A single generative AI model often performs a wide range of tasks by receiving different inputs, such as prompts (e.g., input instructions, rules, example inputs, example outputs, and/or tasks), data, and/or access to data. In response, the generative AI model generates various output formats, ranging from one-word answers to long narratives, images and videos, labeled datasets, documents, tables, and presentations.

Moreover, generative AI models are primarily based on transformer architectures for understanding, generating, and manipulating human language. Generative AI models can also utilize other types of architectures, such as recurrent neural network (RNN) architectures, long short-term memory (LSTM) architectures, or convolutional neural network (CNN) architectures. Examples of generative AI models include generative pre-trained transformer (GPT) models like GPT-3.5, GPT-4, and GPT-4o; bidirectional encoder representations from transformers (BERT) models; text-to-text transfer transformer models like T5; conditional transformer language (CTRL) models; and Turing-NLG. Other types of generative AI models include sequence-to-sequence models (Seq2Seq), vanilla RNNs, and LSTM networks. In some instances, a generative AI model includes a large language model (LLM), a small language model (SLM), and a small action model (SAM), which serves as a text-based version of a generative AI model that receives text prompts and/or generates text outputs. In various implementations, a generative AI model may function as a multimodal generative model that receives multiple input formats (e.g., text, images, video, data structures) and/or generates multiple output formats.

As another example, the terms "prompt," "model prompt," or "generative AI model prompt" refer to a request provided to a large generative image model to create generative AI model output based on plain language guidance. In various instances, the prompt is a prompt for the generative AI model to generate a topic name based on text labels.

As another example, the terms "query response" or "response" refer to the generated output produced by a generative AI model (e.g., a visual-based generative AI model) in reaction to a given prompt. A response can take various forms, such as natural language text, images, or other structured data.

As an example, the terms "event data," "user event data," and "user data" refer to stored information that includes one or more user identifiers. For example, event data for users includes content interaction logs involving users, websites, documents, links, images, and other content with which user interactions were recorded. The types and formats of event data can vary. In addition, most event data items include one or more text labels. Text labels may be generated or parsed from the content of event data items (e.g., item title, header information, metadata, content, description, and corresponding queries).

Additional example implementations and details of the profile generation system are discussed in connection with the accompanying figures, which are described next. For example, FIG. 1 illustrates an example overview of implementing a profile generation system that uses a generative artificial intelligence (AI) model to determine topic names from event data for generating universal user web profiles according to some implementations. As shown, FIG. 1 illustrates a series of acts 100 performed (or caused to be performed) by the profile generation system.

As shown, the series of acts 100 includes act 101 of generating text embeddings from user event data, with each text embedding maintaining a corresponding text label. In various implementations, the profile generation system obtains event data for users from one or more sources and utilizes an embedding neural network to map the event data items to an embedding space. In particular, the profile generation system provides user data along with a text label to the embedding neural network, which carries the text label forward and assigns it to the user event embedding. Additional details regarding aggregating event data and generating event data embeddings are provided below in connection with FIG. 3.

The series of acts splits into two paths. In a first path, act 102 includes generating text embedding clusters, determining a subset of embeddings from a cluster, and identifying the text labels of the selected subset of embeddings. For instance, the profile generation system uses a clustering algorithm to create clusters of the event data embeddings to group semantically similar event data items. For each cluster, the profile generation system may select some or all of the event data embeddings in a cluster and then identify their text labels. Additional details regarding event data embedding clustering and selecting corresponding text labels are provided below in connection with FIG. 4.

Act 103, in the first path, includes providing the identified text labels for a cluster to a generative AI model with instructions to generate a topic name for the cluster. In various implementations, the profile generation system provides a prompt with the selected text labels for a cluster to a generative AI model, with instructions to generate a topic name for the cluster. The profile generation system can repeat this action for additional clusters. Additional details regarding a generative AI model generating topic names for clusters are provided below in connection with FIG. 4.

In the second path, act 104 includes mapping user event data for a first user to an embedding space. For example, the profile generation system identifies items from the event data that correspond to a specific user. The profile generation system may convert that data into an embedding space. Additional details about mapping user-specific event data to an embedding space are provided below in connection with FIG. 6.

Also in the second path, act 105 includes mapping topic names to the embedding space and assigning the first user event items to topic names based on embedding correlations. In some instances, the profile generation system obtains (represented by the arrow from act 103 to act 105) a list of topic names created from the event data of multiple users by the generative AI model and maps the topic names to the same embedding space that includes the user-specific item embeddings. The profile generation system then correlates the user-specific item embeddings to nearby topic name embeddings. When a sufficient correlation strength exists between a user-specific item embedding and a topic name embedding, the profile generation system assigns the corresponding user event data item to the corresponding topic name. Additional details about correlating user-specific item embeddings to generated topic names are provided below in connection with FIG. 6.

Act 106 includes generating a user profile based on the assigned topic names. For example, the profile generation system creates a universal user web profile that includes some or all of the topic names allocated to a user based on correlations with their event data. In some instances, the universal user web profile is distilled to the list of topic names (and not the user event data itself). Further, a universal user web profile may include a culled or curated list of topic names identified from the standardized list of topics determined to be of most interest to the first user. Additional details about generating universal user web profiles are provided below in connection with FIG. 6.

Figure 2:
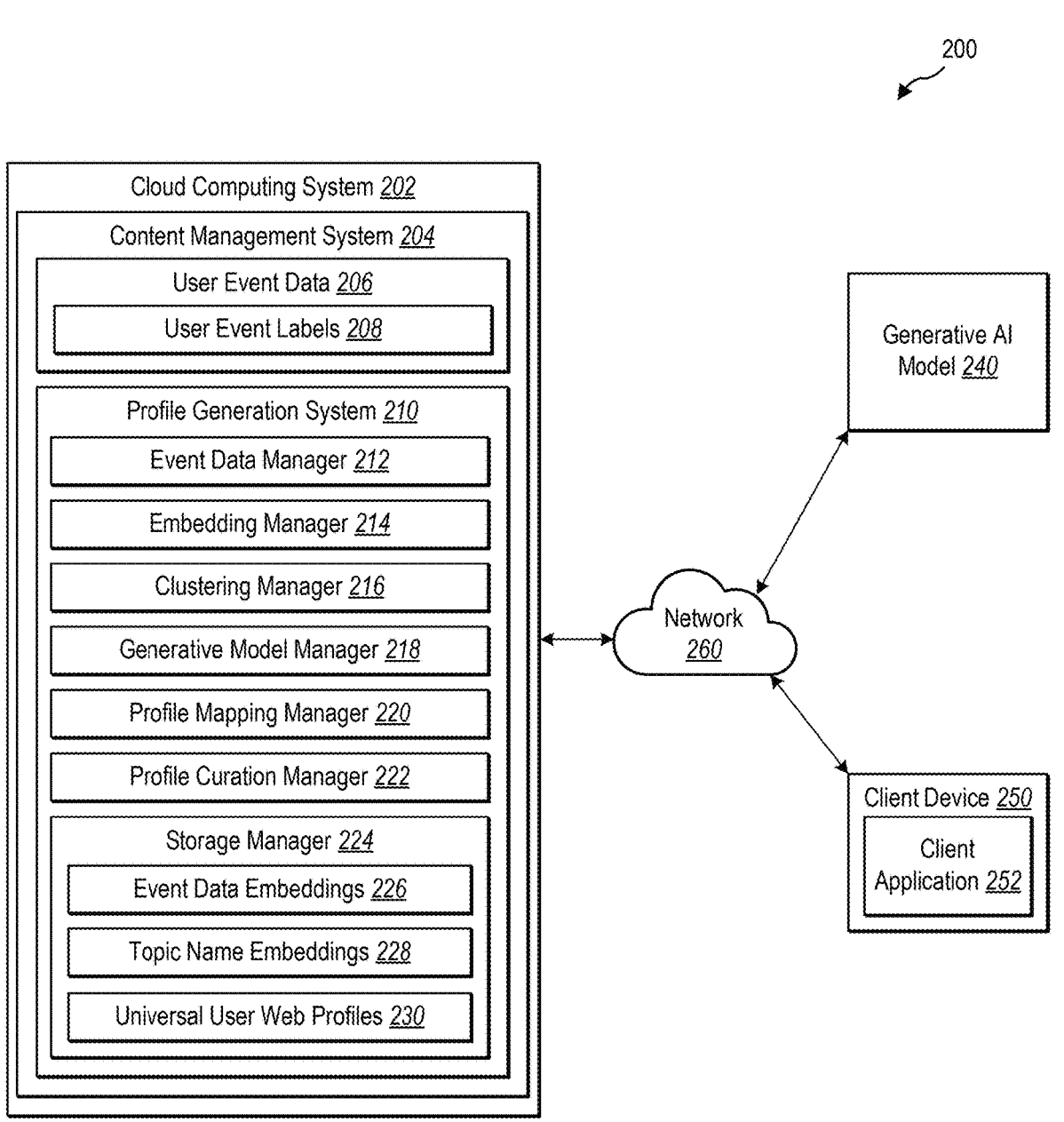
FIG. 2 illustrates an example computing environment in which the profile generation system (e.g., universal user web profile generation system) is implemented in a cloud computing system.

With a general overview in place, the next figure provides an overview of the components, features, and elements of the profile generation system. To illustrate, FIG. 2 shows an example computing environment where the profile generation system is implemented in a cloud computing system according to some implementations. In particular, FIG. 2 shows an example of a computing environment 200 with various computing devices within a cloud computing system 202 associated with a profile generation system 210. While FIG. 2 shows example arrangements and configurations of the computing environment 200, the cloud computing system 202, the profile generation system 210, and associated components, other arrangements and configurations are possible.

As shown, the computing environment 200 includes a cloud computing system 202, a generative AI model 240, and a client device 250 connected via a network 260. The cloud computing system 202 includes a content management system 204 and the profile generation system 210 (e.g., a universal user web profile generation system). Each of these systems and/or components may be implemented on one or more computing devices, such as a set of one or more server devices. Further details regarding computing devices are provided below in connection with FIG. 9, along with additional details about networks, such as the network 260 shown.

The content management system 204 performs a variety of functions. In various implementations, the content management system 204 facilitates the management of content interactions between users and content items. As shown, the content management system 204 includes user event data 206 having user event labels 208. For instance, the content management system 204 identifies user interactions with content at various content sources and stores the interactions as user event data 206. Additionally, the content management system 204 can store one or more of the user event labels 208 that describe or are associated with the event data items.

As shown, the content management system 204 implements the profile generation system 210. Before describing the components of the profile generation system 210, other components of the computing environment 200 are first discussed. As shown, the cloud computing system 202 includes the generative AI model 240, which generates responses to prompts and other inputs. As described above, the generative AI model 240 may represent various types of generative AI models. In some implementations, the generative AI model 240 represents multiple instances of generative AI models.

While not shown, in some instances, the cloud computing system 202 can include various content sources. For example, content sources may include webpages, images, and/or other content. In some implementations, a content source includes a database of images. Content sources can include various types of data repositories.

As shown, the computing environment 200 includes the client device 250. In various implementations, the client device 250 is associated with a user (e.g., a user client device), such as a user who interacts with the content sources. For example, the client device 250 includes a client application 252, such as a web browser or another form of a computer application, which allows a user to interact with content items. Upon a user interacting with content, event data may be created that records the interactions and/or surrounding information. The event data for users may be provided to the content management system 204.

Returning now to the profile generation system 210, which is shown as implemented within the content management system 204. In some implementations, the profile generation system 210 is located on a separate computing device from the content management system 204 within the cloud computing system 202. For example, the profile generation system 210 can be on another server device, or the profile generation system 210 can be located wholly or in part on the client device 250.

As shown, the profile generation system 210 includes various components and elements, which are implemented in hardware and/or software. For example, the profile generation system 210 includes an event data signal manager 212, which identifies or obtains user event data 206 and user event labels 208; an embeddings manager 214, which generates event data embeddings 226 and/or topic name embeddings 228; and a clustering manager 216, which creates embedding clusters from the event data embeddings 226.

Additionally, the profile generation system 210 includes a generative model manager 218, which interacts with the generative AI model 240 to provide various prompts and corresponding inputs, then receives back generative responses; a profile mapping manager 220, which curates topic names received from the generative AI model 240 and correlates event data embeddings 226 with topic name embeddings 228; and a profile curation manager 222, which generates and updates universal user web profiles 230 based on the topics associated with a specific user. The profile generation system 210 also includes a storage manager 224 that stores the event data embeddings 226, the topic name embeddings 228, the universal user web profiles 230, and other data stored and accessed by the profile generation system 210.

Figure 3:
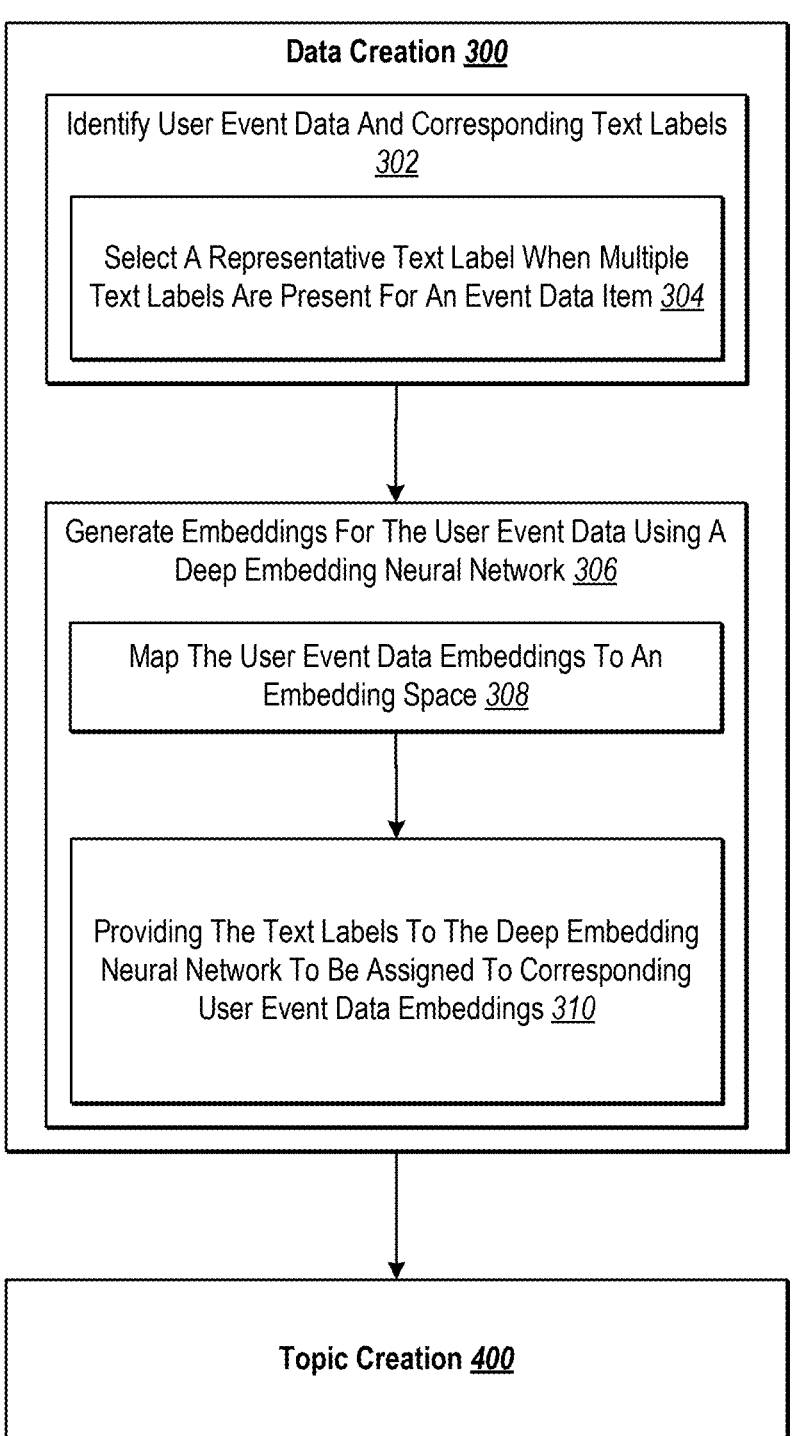
FIG. 3 illustrates an example diagram of aggregating event data as part of generating universal user web profiles.

As noted above, FIG. 3 through FIG. 7 provide example diagrams of operations and actions of the profile generation system 210 utilizing neural networks and generative AI models to generate universal user web profiles. To begin, FIG. 3 provides additional details about aggregating event data and generating event data embeddings. In particular, FIG. 3 illustrates an example diagram of aggregating event data as part of generating universal user web profiles according to some implementations.

As shown, FIG. 3 includes the profile generation system 210 performing data creation 300. The profile generation system 210 performs data creation operations through various acts and sub-acts. For example, the profile generation system 210 performs act 302 of identifying user event data and corresponding text labels.

In various implementations, act 302 involves obtaining event data and other event signals for user interactions with content items. The profile generation system 210 can obtain event data from a variety of sources, such as a content management system, content sources, and/or other data stores that maintain user interactions. In some implementations, the user event data is gathered from user data (e.g., user histories or logs) or other user information that users consent to share. As mentioned above, the profile generation system 210 can scale to obtain a very large quantity of event data (e.g., billions) for a large number of users (e.g., millions). Additionally, the profile generation system 210 can gather event data of a variety of data types (e.g., text-, image-, audio-, or video-based).

In one or more implementations, the profile generation system 210 filters out one or more event data items that negatively affect the system's ability to measure user interest in topics. For instance, the profile generation system 210 filters out non-useful items, such as interest-agnostic items (e.g., search queries for "Search Engine ABC" or "XYZ Maps") and/or navigational queries (e.g., "website.com"). In some instances, the profile generation system 210 filters out extreme comment events, which may cause skewing toward generic or non-interest topics. The profile generation system 210 may also exclude users that have over a threshold number of user event data items, as they are likely non-human bots. In various implementations, the profile generation system 210 filters out user event data that exceeds a freshness threshold (e.g., omitting data over 1 year old).

In addition, act 302 includes the profile generation system 210 identifying a text label for each event data item. For example, for each event data item, the profile generation system 210 identifies a text label that represents, embodies, and/or characterizes the item. In many instances, the text is extracted from a portion of an event data item, such as a title. In some implementations, the profile generation system 210 disregards items without an extractable text label. In alternative implementations, the profile generation system 210 creates a label from the event data source or content (e.g., using a generative AI model to create a text label from the content).

In various implementations, an event data item includes multiple candidate text labels. For example, if the event data item is a webpage provided in response to a search query, candidate text labels can include a page title, page headers, content sections, page content, page metadata, the search query, and other text associated with the webpage. If the event data item is a product interaction, the text label may be the product name, a product description, a product link, or other product text content.

When multiple text labels are present for an event data item, the profile generation system 210 can select a representative text label, as shown in sub-act 304. In various implementations, the profile generation system 210 utilizes a text-quality hierarchy to select a representative text label. For example, the text-quality hierarchy uses a hierarchy of, in descending order: search queries, webpage titles, webpage content headers, webpage metadata content, and webpage content. In various implementations, the profile generation system 210 may apply a different text-quality hierarchy to different event data item format types (e.g., a first hierarchy for webpages, a second hierarchy for selected content, and a third hierarchy for articles).

In some implementations, the profile generation system 210 selects a representative text label for an event data item by generating a consolidated label. For example, the profile generation system 210 utilizes a generative AI model to generate a text label based on the text labels, content, metadata, source links, and/or other associated data. In response, the generative AI model provides a text label to represent the event data item.

Act 306 includes the profile generation system 210 generating embeddings for the user event data using a deep embedding neural network. For example, the profile generation system 210 provides the identified event data for the user and corresponding text labels to an embedding neural network. For instance, the embedding neural network generates embeddings (e.g., feature vectors) from the user event data.

In various implementations, the profile generation system 210 generates and/or trains the deep embedding neural network. In some implementations, the profile generation system 210 obtains a pre-trained embedding neural network and fine-tunes it based on user event data. In one or more implementations, the profile generation system 210 utilizes a pretrained and pre-tuned embedding neural network.

The profile generation system 210 may use the embedding neural network to map the user event data embeddings to an embedding space, as shown in sub-act 308. In various implementations, embedding space refers to a high-dimensional vector space where pieces of event data are represented as vectors. In this space, similar texts are positioned closer together, while dissimilar texts are farther apart. This allows for efficient comparison and analysis of text based on its semantic meaning.

In various implementations, the embedding neural network is a text embedding neural network that maps generated feature vectors to a text embedding space where pieces of text (e.g., words, sentences, or documents) are represented as vectors. In various implementations, using a text embedding neural network reduces computational requirements compared to using more complex embedding neural networks.

In various implementations, the profile generation system 210 utilizes different embedding neural networks to generate embeddings for different event data format types. In these instances, the various embedding neural networks may generate embeddings to the same or similar embedding space. In some implementations, the embedding neural network is a multimodal embedding neural network that receives event data from a variety of format types.

Sub-act 310 includes providing text labels to the deep embedding neural network to be assigned to corresponding user event data embeddings. As mentioned above, in some instances, the profile generation system 210 provides the text labels along with the event data to the embedding neural network. The embedding neural network can pass the text label through the model and associate the text label with the corresponding embedding. Accordingly, the event data is distilled to an embedding, which maintains its text label even within the embedding space.

In performing data creation 300, the profile generation system 210 converts user event data for most or all of a set of users into feature vectors in an embedding space. However, by tagging each embedding with a representative text label, both plain language context (e.g., the text label) and semantic context (e.g., the embedding) are preserved. Embedding is one step that the profile generation system 210 uses to enable the scalability of vast amounts of user data.

Upon performing data creation 300, the profile generation system 210 can proceed to the process of topic creation 400, which is described in the next figure. As mentioned above, FIG. 4 provides additional descriptions about event data embedding clustering and selecting corresponding text labels and a generative AI model generating topic names for clusters. In particular, FIG. 4 illustrates an example of creating topic names as part of generating universal user web profiles according to some implementations.

Figure 4:
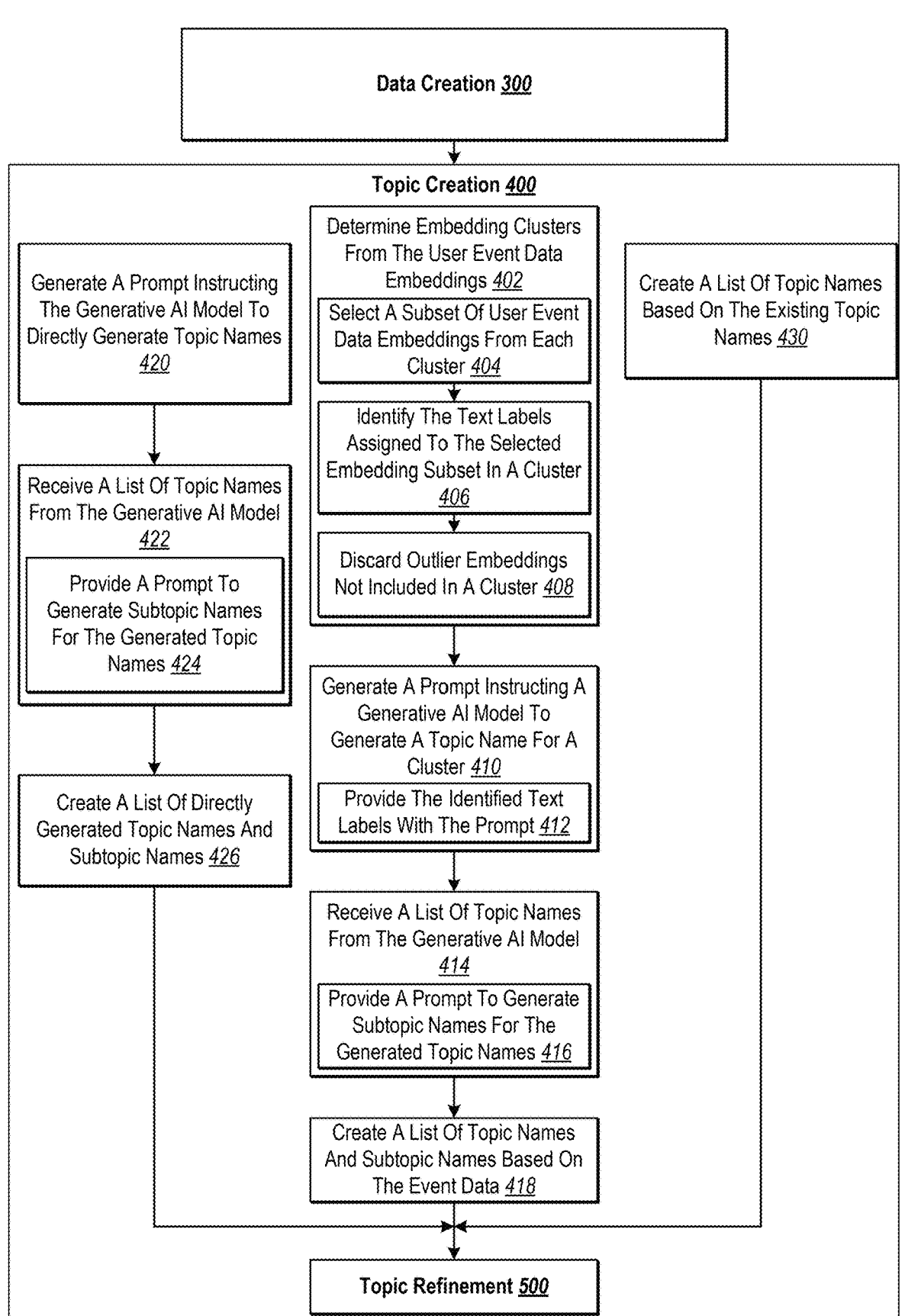
FIG. 4 illustrates an example of creating topic names as part of generating universal user web profiles.

As shown, FIG. 4 includes the profile generation system 210 performing topic creation upon completing data creation 300 and before performing topic refinement 500. The profile generation system 210 performs topic creation operations through various acts and sub-acts. As shown, topic creation 400 includes three paths. In many implementations, the profile generation system 210 performs the middle path (e.g., act 402 through act 418). In various implementations, the profile generation system 210 may also perform the left path and/or the right path. Each path is described below.

Starting with the center or middle path, the profile generation system 210 may perform act 402 of determining embedding clusters for the user event data embeddings. In various implementations, the profile generation system 210 utilizes a clustering model or algorithm (e.g., K-means, density-based spatial clustering of applications with noise (DBSCAN), Gaussian Mixture Model, Balanced Iterative Reducing and Clustering using Hierarchies (BIRCH), affinity propagation, means-shift, spectral, or other types of clustering algorithms) to generate embedding clusters from among the event data embeddings.

Many event data embeddings will be grouped into an embedding cluster, representing semantically similar event data items. Indeed, the clusters of event data for users correspond to relevant topics for common users. Each cluster may represent a candidate topic to include in a topic taxonomy. Accordingly, the profile generation system 210 determines a topic name based on each topic.

To illustrate generating candidate topic names from the cluster embeddings, act 402 includes sub-act 404 of selecting a subset of user event data embeddings from each cluster. In many instances, an embedding cluster includes a large number of event data embeddings, which, if they were all provided to a generative AI model, would greatly exceed the input token limits. Additionally, providing all of the embeddings would require large amounts of bandwidth and computational resources to process. Furthermore, because the embeddings in a cluster are semantically similar, providing all of the embeddings would be computationally wasteful, as much of the information provided by adjacent embeddings is often redundant.

Accordingly, in various implementations, the profile generation system 210 selects a subset of embeddings (e.g., sample embeddings) from each embedding cluster. For example, the profile generation system 210 selects a predetermined amount (e.g., number or percentage) of the embeddings in a cluster as samples. In some instances, the profile generation system 210 may select additional embeddings until a minimum number threshold is met.

The profile generation system 210 may select the sample embeddings for a cluster using various approaches. For example, the profile generation system 210 selects event data embeddings closest to the center. The profile generation system 210 may randomly select embeddings. In some implementations, the profile generation system 210 uses a combination of selecting central, outlier, and random embeddings.

In some implementations, the profile generation system 210 selects embeddings based on their corresponding text labels. For instance, the profile generation system 210 identifies the text labels and their types for each embedding. The profile generation system 210 then uses the text quality hierarchy introduced above to select the event data embeddings with the highest label quality until the sample quota is filled.

Sub-act 406 includes identifying the text labels assigned to the selected embedding subset in a cluster. Once the sample of embeddings is selected for a cluster, the profile generation system 210 identifies the text labels assigned or paired with each of the selected event data embeddings. For instance, the profile generation system 210 adds text labels to a list or structured file. By doing so, the profile generation system 210 creates a list of text labels that represent a cluster. In various implementations, the profile generation system 210 performs the clustering, sample embedding selection, and/or text label selection in parallel actions for multiple clusters.

Sub-act 408 includes discarding outlier embeddings not included in a cluster. In some instances, some of the event data embeddings will not group into an embedding cluster. In these instances, the profile generation system 210 may disregard these embeddings when determining the topic taxonomy. For instance, the profile generation system 210 ignores these embeddings as they are not included in a cluster, and only text labels from selected embeddings are used in the next processing phase. In some implementations, the profile generation system 210 discards outliers earlier in the clustering and sample selection phase. As an example, the profile generation system 210 can determine around 100,000 clusters based on user event data. In another example, the profile generation system 210 generates over one million topics.

As mentioned above, in some instances, the profile generation system 210 determines a topic name for an embedding cluster. Furthermore, the profile generation system 210 may use a generative AI model with the selected text labels to create the topic name for the cluster. To illustrate, act 410 includes the profile generation system 210 generating a prompt instructing the generative AI model to generate a topic name for a cluster.

In various implementations, the profile generation system 210 provides a topic name generative prompt requesting that the generative AI model analyze a set of provided text labels and generate a representative topic label for an embedding cluster. For example, the prompt includes instructions to generate a topic name for a cluster of embedded user event data items based on a representative sample of text labels. In some instances, the prompt also includes context information for the generative AI model to use while generating the topic name.

As shown in sub-act 412, the profile generation system 210 can provide the identified text labels along with the prompt to the generative AI model. In response, the generative AI model uses the prompt and the text labels to generate and return the topic name. By using the sample text labels (and only the sampled text labels in many cases), the generative AI model can generate a topic name that accurately represents user event data associated with a cluster. Furthermore, because only the sample text labels are provided to the generative AI model rather than all labels or all of the corresponding user event data, the generative AI model can generate a topic name more quickly and efficiently.

In various implementations, the topic name generative prompt is a lightweight prompt that the generative AI model processes quickly and with low latency. In some implementations, the generative AI model can process several topic name generative prompts concurrently. From one of the examples above, the profile generation system 210 uses the generative AI model to generate topic names for each of the 100,000 clusters.

Act 414 includes the profile generation system 210 receiving a list of topic names from the generative AI model. In various implementations, the profile generation system 210 repeats act 410 for some or all of the clusters and receives a corresponding number of generated topic names from the generative AI model. In some instances, the topic name generative prompt for the topics is sent and/or received from the generative AI model as a batch. For example, the generative AI model provides a response that includes the list of topic names to the profile generation system 210 upon determining topic names for each of the requested clusters.

Act 414 includes a sub-act 416 of providing a prompt to generate subtopic names for the generated topic names. For example, the profile generation system 210 creates and provides a subtopic name generative prompt to the generative AI model with instructions to generate additional topic names that belong to a provided topic name (e.g., the generated topic name) by expanding the topic into more specific topics. In some implementations, the topic name generative prompt described above includes additional instructions to generate both the topic name and a set of subtopic names.

Act 418 includes creating a list of topic names and subtopic names based on the event data. The profile generation system 210 can then use the list of topic names and begin the process of topic refinement.

As mentioned above, the profile generation system 210 can perform topic creation 400 using multiple approaches. On the left path, the profile generation system 210 performs act 420 of generating a prompt instructing the generative AI model to directly generate topic names. For example, the profile generation system 210 generates a direct topic name generative prompt that instructs the generative AI model to generate a set of broad topics based on providing a general context of the user event data in the prompt.

Act 422 includes receiving a list of topic names from the generative AI model. For example, in response to the direct topic name generative prompt, the generative AI model provides a response that includes a list of topic names. In various implementations, directly prompting the generative AI model without providing a set or list of text labels (e.g., prompt only and no text labels) allows the profile generation system 210 to provide comprehensive coverage (e.g., breadth and depth) and characterization of important topics, as generative AI models are trained on a wide range of data sources, types, and content.

In sub-act 424, the profile generation system 210 provides a prompt to generate subtopic names for the generated topic names. As before, the batch call to the generative AI model to generate subtopics helps to create a two-level (or multi-level) taxonomy, creating a comprehensive topic taxonomy to use with the user event data.

Act 426 includes the profile generation system 210 creating a list of direct topic names and subtopic names based on the event data. The profile generation system 210 can then use the list of topic names and begin the process of topic refinement. In various implementations, the profile generation system 210 performs the left path periodically, such as when an update occurs to the generative AI model.

On the right path, the profile generation system 210 performs act 430 of creating a list of topic names based on the existing topic names. For example, the profile generation system 210 identifies a set of broad topics from previously provided and/or generated topic names. In various instances, the profile generation system 210 also identifies existing subtopic names.

In some instances, the profile generation system 210 provides a prompt to generate subtopic names for the existing topic names in a similar manner to what was discussed above. The profile generation system 210 can then use the list of reviewed topic names and begin the process of topic refinement.

In many implementations, the profile generation system 210 performs the acts in the middle path regularly while occasionally adding actions from the left path and/or the right path. In any case, if multiple paths are followed, the profile generation system 210 can combine the generated topic names together and provide the list when performing topic refinement 500.

Figure 5:
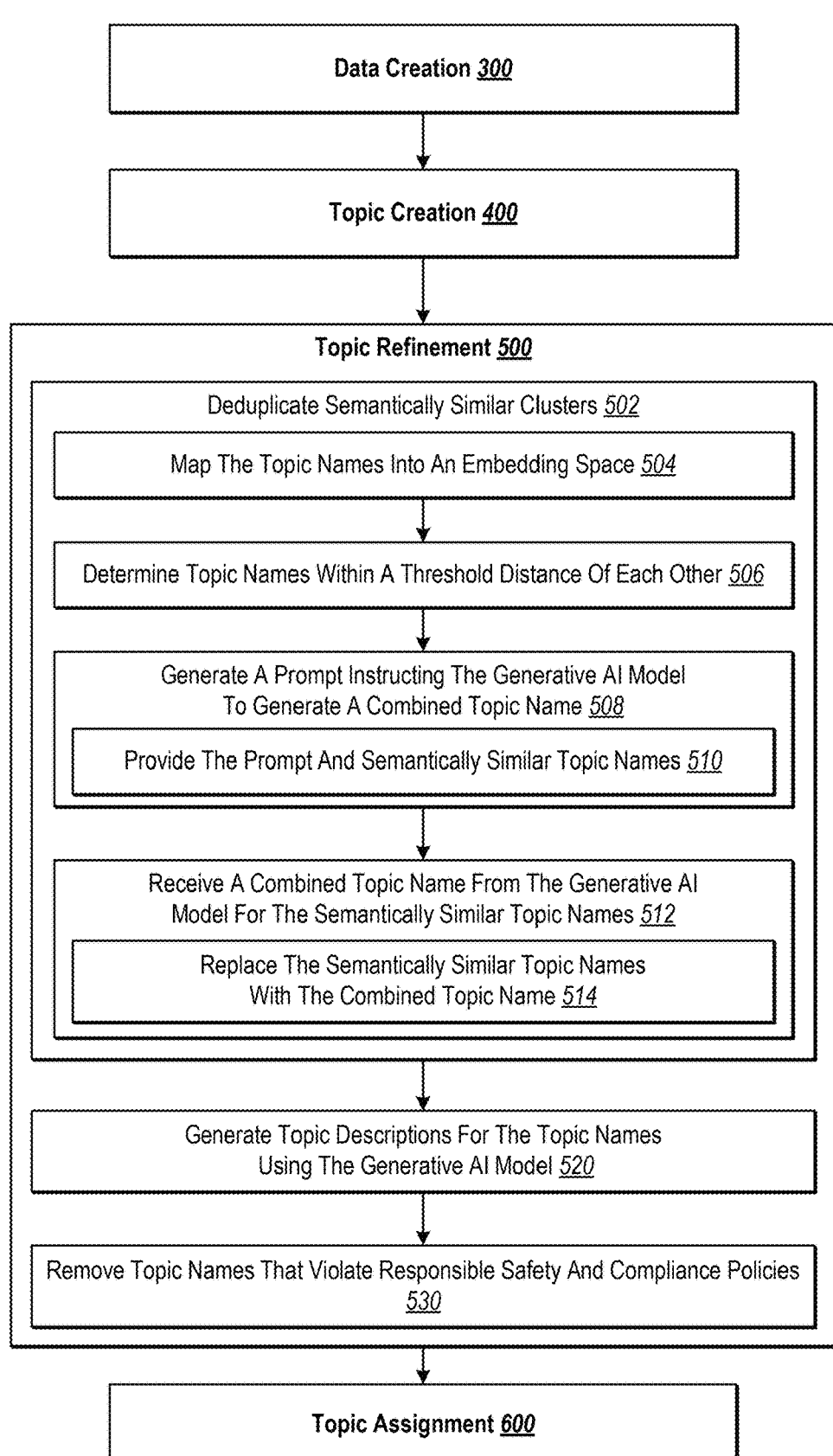
FIG. 5 illustrates an example diagram of refining topic names as part of generating universal user web profiles.

FIG. 5 provides additional details about the profile generation system 210 performing topic refinement. In particular, FIG. 5 illustrates an example diagram of refining topic names as part of generating universal user web profiles according to some implementations. As shown, topic refinement 500 follows the profile generation system 210 performing data creation 300 and topic creation 400.

As shown, as part of performing topic refinement 500, the profile generation system 210 performs act 502 of deduplication of semantically similar clusters. For example, the profile generation system 210 further refines the topic list by culling redundant and duplicative topic names. In some instances, redundancies may stem from various imperfections in the clustering process or the generative AI model producing slightly different topics that essentially cover the same subject. When the profile generation system 210 utilizes the generative AI model to generate topic names from the multiple paths, duplicate topics may also occur.

As part of deduplication, the profile generation system 210 performs sub-act 504 of mapping the topic names into an embedding space. For example, the profile generation system 210 uses the same or different embedding neural networks as described above to generate feature vector embeddings from the topic names on the list. Mapping topic names on the list allows topics that are semantically similar to be grouped together.

Sub-act 506 includes determining topic names within a threshold distance of each other. For example, the profile generation system 210 uses a nearest neighbor algorithm to identify when two or more topic name embeddings are within a threshold distance of each other, indicating that those topics are semantically similar. Indeed, two topic name embeddings within the same similarity threshold distance in the embedding space indicate two embedding clusters from the topic creation 400 that are adjacent to each other. In some implementations, the profile generation system 210 uses vector distance measurement algorithms to identify topic name embeddings that are within a similarity threshold distance.

Sub-act 508 includes generating a prompt instructing the generative AI model to generate a combined topic name. For example, the profile generation system 210 creates a combined topic name prompt that instructs the generative AI model to analyze two or more semantically similar topic names and generate a new combined topic name. In some implementations, the combined topic name matches one of the provided semantically similar topic names. In some implementations, the combined topic name is a new topic name not included in the list of topic names provided by the topic creation 400.

In addition, the profile generation system 210 provides the prompt and the semantically similar topic names to the generative AI model, as shown in sub-act 510. In particular, the profile generation system 210 can provide the combined topic name prompt along with semantically similar topic names and receive the combined topic name back.

To illustrate, sub-act 512 includes the profile generation system 210 receiving a combined topic name from the generative AI model for the semantically similar topic names. In response, the profile generation system 210 can assign the combined topic name to the topic names within the threshold distance. As shown in act 514, the profile generation system 210 replaces the semantically similar topic names with the combined topic name. In various implementations, the profile generation system 210 removes the duplicate topic names and replaces them with the combined topic name. In some implementations, the length of a topic name list can be reduced by up to 30% to 50% (or more) by removing and/or replacing semantically similar topic names.

Act 520 includes generating topic descriptions for the topic names using the generative AI model. In various implementations, the profile generation system 210 creates and provides a topic description prompt to the generative AI model. In some instances, the prompt includes instructions to include topic name definitions and explain why users might be interested in a given topic based on the topic hierarchy. By doing so, the topic descriptions can provide clarity and context for each topic, which can also assist in improving topic comprehension.

Act 530 includes removing topic names that violate responsible safety and compliance policies. At any time and sometimes on multiple instances, the profile generation system 210 performs responsible AI checks to ensure safe and compliant topic names. In particular, the profile generation system 210 can perform compliance filtering to remove topics that are not relevant or appropriate. In some implementations, the profile generation system 210 also removes non-useful topics that have been reintroduced since filtering them out.

Upon performing deduplication, topic descriptions, and/or responsible AI, the profile generation system 210 has a curated topic list. Indeed, the profile generation system 210 generates an initial topic list aligned with user event data from numerous uses, culls, and refines the topic list to obtain a curated topic list.

In various implementations, the profile generation system 210 updates the topic taxonomy. For example, when a new embedding neural network or generative AI model is released, the profile generation system 210 repeats the topic creation 400 and the topic refinement 500 processes. Additionally, when new user event data is obtained, the profile generation system 210 may update the topic taxonomy.

Figure 6:
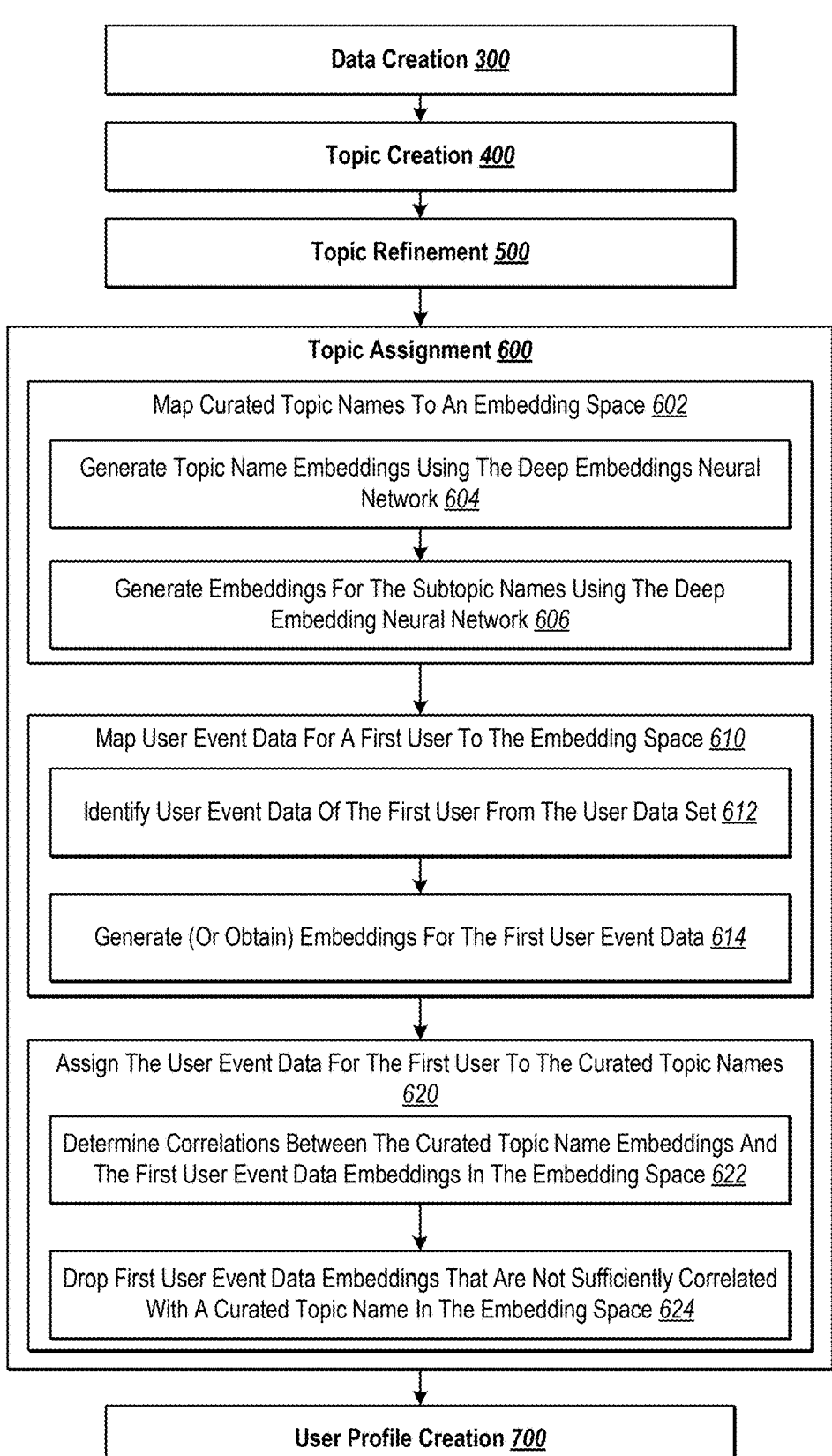
FIG. 6 illustrates an example diagram of assigning curated topic names to users as part of generating universal user web profiles.

As mentioned above, FIG. 6 provides additional details about mapping user-specific event data to an embedding space and correlating user-specific item embeddings to generated topic names. In particular, FIG. 6 illustrates an example diagram of assigning curated topic names to users as part of generating universal user web profiles according to some implementations. As shown, topic assignment 600 follows the profile generation system 210 performing data creation 300, topic creation 400, and topic refinement 500, as well as proceeding to user profile creation 700.

As shown, as part of performing topic assignment 600, the profile generation system 210 performs act 602 of deduplication of mapping curated topic names to an embedding space. To illustrate, sub-act 604 includes the profile generation system 210 generating curated topic name embeddings using the deep embedding neural network. For example, the profile generation system 210 generates feature vector embeddings for the curated topic names and maps them to the embedding space. The profile generation system 210 can use the same embedding neural network, such as a text embedding neural network, introduced above.

Sub-act 606 includes generating embeddings for subtopic names using the deep embedding neural network. In various implementations, the profile generation system 210 also maps topic levels from other levels of the taxonomy hierarchy to the embedding space.

Act 610 includes mapping user event data for a first user to the embedding space. As shown in sub-act 612, the profile generation system 210 identifies the user event data of the first user from the user data set. For example, the profile generation system 210 identifies user event data that includes a user identifier of the first user or is otherwise associated with the first user.

In addition, as shown in sub-act 614, the profile generation system 210 generates (or obtains) embeddings for the first user event data. For example, the profile generation system 210 generates feature vector embeddings for the identified user event data associated with the first user and adds those embeddings to the embedding space with the curated topic name embeddings. In some implementations, the profile generation system 210 obtains the previously generated embeddings for the user event data corresponding to the first user.

Act 620 includes assigning the user event data for the first user to the curated topic names. By combining the curated topic name embeddings with first user event data embeddings, the profile generation system 210 can determine correlations between the two in the embedding space, as shown in sub-act 622. For example, the profile generation system 210 uses a nearest neighbor algorithm to group a first user event data item embedding with the curated topic name embeddings. For example, the profile generation system 210 utilizes K-nearest neighbors (kNN) or approximate nearest neighbors (ANN) search to determine correlations.

In various implementations, when a first user event data item embedding is near a curated topic name embedding, the profile generation system 210 assigns the first user event data item embedding to the corresponding curated topic name. The profile generation system 210 may repeat the process for each event data item of the first user near a curated topic embedding.

Sub-act 624 includes the profile generation system 210 dropping first user event data embeddings that are not sufficiently correlated with a curated topic name in the embedding space. For example, if the proximity for an item embedding exceeds the defined threshold (or does not meet standard deviation criteria) of a nearest neighbors search, the profile generation system 210 does not assign the item to a curated topic name. In various implementations, the profile generation system 210 drops, ignores, or omits the event data item embedding of the first user. In some implementations, using standard deviation allows the profile generation system 210 to apply a dynamic evaluation of similarity to ensure that only relevant topics are associated with each event item.

Figure 7:
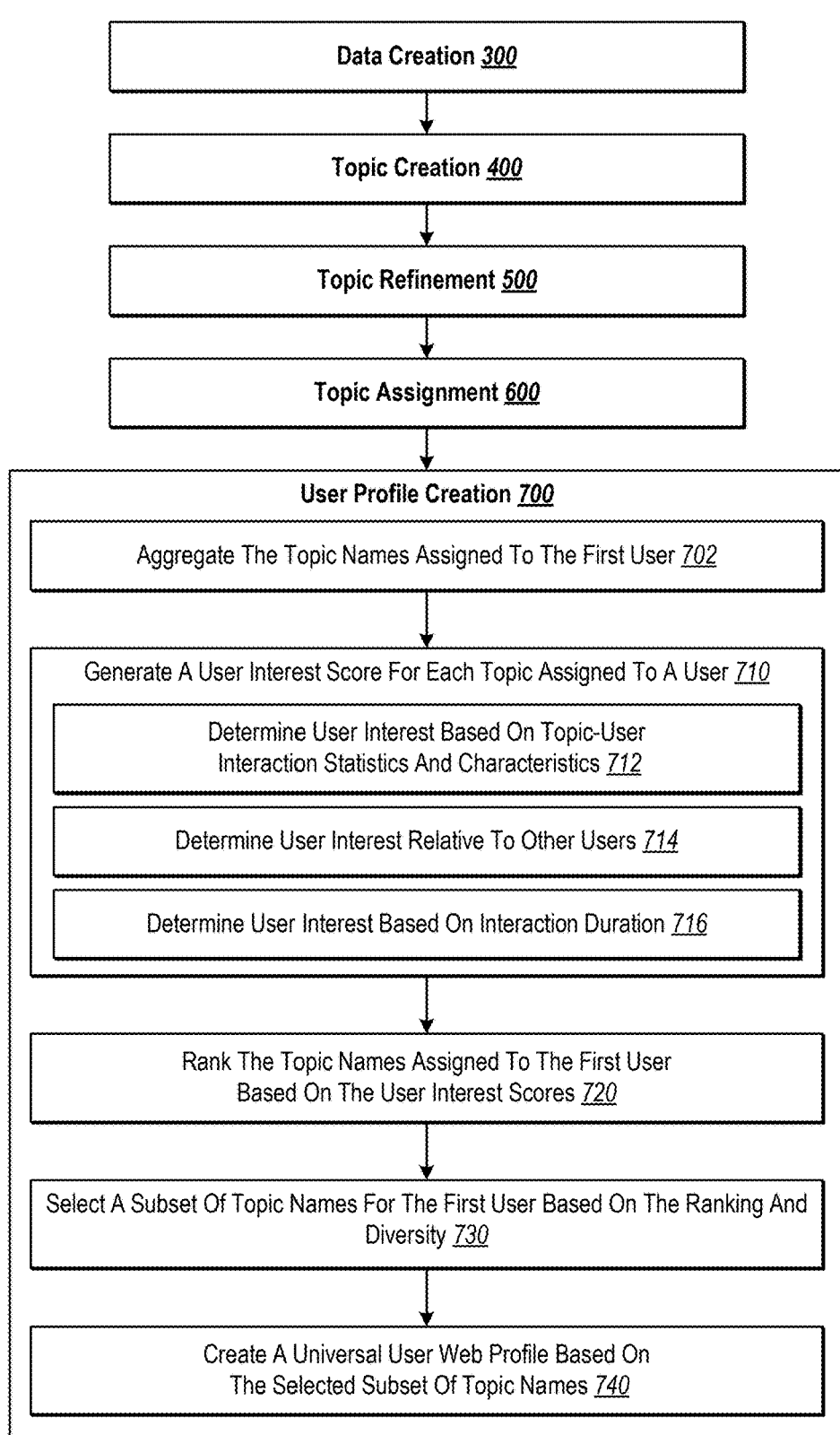
FIG. 7 illustrates an example diagram of generating universal user web profiles from the assigned topics.

FIG. 7 corresponds to user profile creation. In particular, FIG. 7 illustrates an example diagram of generating universal user web profiles from the assigned topics according to some implementations. As shown, user profile creation 700 follows the profile generation system 210 performing data creation 300, topic creation 400, topic refinement 500, and topic assignment 600.

As shown, the process of performing user profile creation 700 includes act 702 of aggregating the topic names assigned to the first user. For example, the profile generation system 210 counts, tallies, totals, or otherwise aggregates which topic names were assigned to the first user based on the correlations between the curated topic names with the event data embeddings of the first user.

To elaborate, in some instances, multiple event data items for the first user are assigned to the same curated topic name. In these instances, the curated topic name is counted for each assignment. In various implementations, metadata about the event data items are aggregated with the curated topic name count. For example, the profile generation system 210 includes the interaction time event data item and/or other corresponding information. In this manner, the profile generation system 210 maintains a record of curated topic names directly tied to the first user and to the events that triggered a topic name match.

Act 710 includes generating a user interest score for each topic assigned to a user. For instance, the number of topics assigned to a user may be significant (e.g., thousands of assigned topic names). Furthermore, many of the assigned topics may only be tangentially related to the interests of a user. Accordingly, in various instances, the profile generation system 210 scores the user-assigned topics to direct focus on the more relevant assigned topics.

To illustrate, act 710 includes three sub-acts corresponding to factors the profile generation system 210 can use to generate a user interest score. Sub-act 712 includes determining user interest based on the topic-user interaction statistics and characteristics. For example, the profile generation system 210 determines how interested the user is in an assigned topic based on the number of times the topic has been assigned, user interaction freshness with the topic (e.g., how recently the last one or more interactions occurred), and/or the regularity of interactions with the assigned topic. Indeed, the profile generation system 210 can determine user interest based on direct interactions between the user and an assigned topic, especially in relation to user interactions with other assigned topics.

Sub-act 714 includes determining user interest relative to other users. For instance, the profile generation system 210 determines the user's interest in an assigned topic relative to other users. For example, the profile generation system 210 determines if the user has an above- or below-average interaction rate with an assigned topic compared to other users with the same topic (e.g., topic interaction uniqueness). Indeed, by determining an inverse frequency measure of topic interactions relative to other users, the profile generation system 210 can evaluate the topic's importance to the user.

Sub-act 716 includes determining user interest based on interaction duration. For instance, the profile generation system 210 determines or measures how long a user has been interested in the assigned topic (e.g., whether the user had interactions with the assigned topic events over an extended time period). Indeed, a longer sustained interaction pattern with the assigned topic indicates elevated interest levels.

In various implementations, the profile generation system 210 utilizes a user interest score model to determine a user interest score for each topic (e.g., topic name) assigned to the user. In various implementations, the model applies determinantal point processes (DPP) to balance relevance and diversity, which can further remove or eliminate two topics that may still appear to overlap despite the deduplication process. The profile generation system 210 may similarly determine user interest scores for the assigned subtopics.

Act 720 includes ranking the topic names assigned to the first user based on the user interest scores. For example, the profile generation system 210 ranks the assigned topics according to their determined user interest scores. The profile generation system 210 may similarly rank the user interest scores for the assigned subtopics.

Act 730 includes selecting a subset of topic names for the first user based on the ranking and diversity. In various implementations, the profile generation system 210 ranks the topics to select a predetermined number or amount of assigned topics. For example, the profile generation system 210 selects topic names assigned to a user that meet a selection threshold (e.g., top 30 or top 50, top 20%, user interest score over 8/10). The profile generation system 210 can filter out or discard the assigned topics that do not meet the selection threshold. For example, the profile generation system 210 selects the top 50 assigned topics. In addition, the profile generation system 210 may also select the subset of topic names for the first user based on diversity, which can indicate a measure of how semantically different the topics are from each other. By doing so, the profile generation system 210 ensures that the selected subset of topic names are not merely semantic equivalents.

In some implementations, the profile generation system 210 selects a subset of subtopic names for one or more selected topic names. In some instances, the subtopics/topics are assigned in the assignment step, as previously discussed. In one or more implementations, the profile generation system 210 may use the same or different selection thresholds per selected topic based on their rankings. For instance, the profile generation system 210 selects the top one hundred subtopics for a selected topic name. The profile generation system 210 can repeat this process for additional subtopics within other topic taxonomy layers if needed.

Act 740 includes creating a universal user web profile based on the selected subset of topic names. In various implementations, the profile generation system 210 generates a universal user web profile that includes, among other user data, the selected topic names along with their corresponding selected subtopics. Indeed, the profile generation system 210 can create a multi-level topic taxonomy of topics that accurately reflects a user's interests. Furthermore, because the topics are curated from user event data and distilled into standardized topic names, the user profile is universal in nature.

To elaborate, upon generating a universal user web profile, applications on the cloud computing system and user devices that directly or indirectly provide content to users can access the universal user web profile of a user to dynamically provide or deliver individualized content to the user with a high degree of accuracy. Such universal user web profiles improve the accuracy of downstream applications by providing a standardized yet highly accurate set of user insights that make providing appropriate content to users more efficient.

Figure 8:
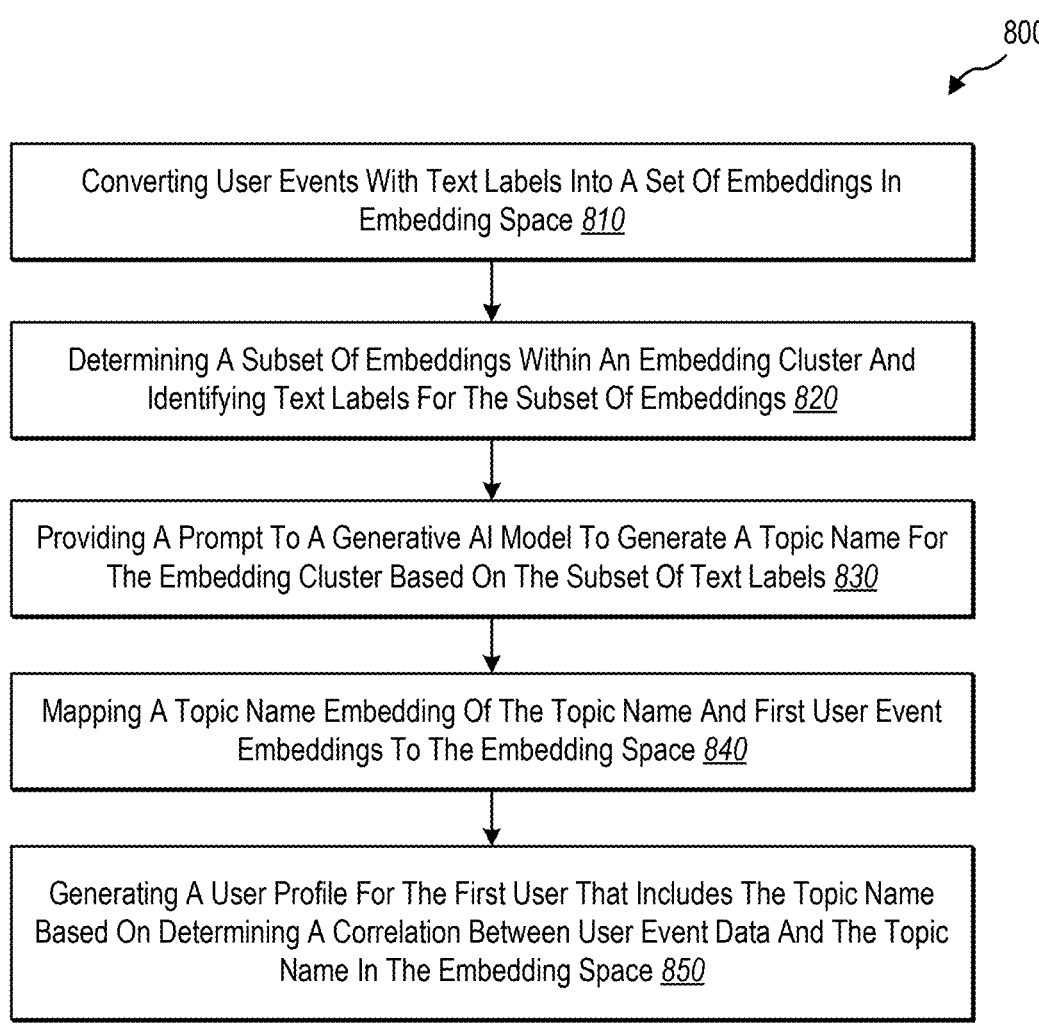
FIG. 8 illustrates an example series of acts in a computer-implemented method for determining topic names from event data using one or more generative artificial intelligence (AI) models.

Turning now to FIG. 8, these figures each illustrate an example flowchart that includes a series of acts for using the profile generation system. In particular, FIG. 8 illustrates an example series of acts in a computer-implemented method for determining topic names from event data using one or more generative artificial intelligence (AI) models according to some implementations.

While FIG. 8 illustrates acts according to one or more implementations, alternative implementations may omit, add to, reorder, and/or modify any of the acts shown. Furthermore, the acts of FIG. 8 can each be performed as part of a method (e.g., a computer-implemented method). Alternatively, a computer-readable medium can include instructions that, when executed by a processing system having a processor, cause a computing device to perform each of the acts of FIG. 8. In some implementations, a system (e.g., a processing system having a processor and a computer memory including instructions that, when executed by the processing system, cause the system to perform various actions or steps) can perform each of the acts of FIG. 8.

As shown in FIG. 8, the series of acts 800 includes act 810 of converting user events with text labels into a set of embeddings in embedding space. For instance, in example implementations, act 810 involves converting a set of user events with text labels into a set of embeddings in embedding space, where the set of embeddings is assigned the text labels corresponding to the set of user events. In various implementations, act 810 includes identifying a set of user events with text labels corresponding to user interactions from a set of users that includes a first user. In one or more implementations, act 810 includes converting a set of user events with text labels into a set of text embeddings in text embedding space using a text embedding model, where the set of text embeddings is assigned the text labels corresponding to the set of user events.

In some implementations, act 810 includes converting a set of user events with text labels into a set of embeddings in embedding space, where the set of embeddings is assigned the text labels corresponding to the set of user events. In some implementations, act 810 includes using a text embedding neural network that maps input data into text embeddings within a text embedding space to create the set of embeddings from the set of user events, wherein the set of embeddings includes a set of text embeddings.

In some implementations, act 810 includes using a deep neural network to create the set of embeddings from the set of user events, where the deep neural network is a multi-modal embedding network that converts data input of different data types into the embedding space. In some implementations, act 810 includes identifying the set of user events from user event signal data based on interactions between user event data and a set of users that includes the first user, determining that a first user event signal from the set of user events corresponds to multiple text labels, and selecting a first text label from the multiple text labels to associate with the first user event signal based on a text quality hierarchy.

As further shown in FIG. 8, the series of acts 800 includes act 820 of determining a subset of embeddings within an embedding cluster and identifying text labels for the subset of embeddings. For instance, in some implementations, act 820 involves identifying a subset of text labels that are assigned to the subset of embeddings based on determining a subset of embeddings within a first embedding cluster in the embedding space. In one or more implementations, act 820 includes generating a set of embedding clusters in the embedding space from the set of embeddings, including generating the subset of embeddings into the first embedding cluster. In some implementations, identifying the subset of text labels assigned to the subset of embeddings includes selecting one or more of the text labels assigned to embeddings within the first embedding cluster based on a text quality hierarchy.

As further shown in FIG. 8, the series of acts 800 includes act 830 of providing a prompt to a generative AI model to generate a topic name for the embedding cluster based on the subset of text labels. For instance, in some implementations, act 830 involves providing a prompt to a generative AI model with prompt instructions to generate a topic name for the first embedding cluster based on the subset of text labels.

In various implementations, act 830 includes providing the subset of text labels to the generative AI model with the prompt, where the prompt instructions instruct the generative AI model to generate the topic name for the first embedding cluster based on the subset of text labels, and receiving the topic name for the first embedding cluster from the generative AI model. In various implementations, act 830 includes providing a first additional prompt to the generative AI model with the first additional instructions to generate a list of topic names without providing the subset of text labels, and providing a second additional prompt to the generative AI model with second additional instructions to generate an additional list of topic names from a previous list of topic names.

In one or more implementations, act 830 includes generating a set of topic names for a set of embedding clusters generated based on the set of embeddings and deduplicating the set of topic names by removing semantically similar topic names. In some implementations, act 830 includes identifying a set of semantically similar topic names from the set of topic names, where the set of semantically similar topic names corresponds to multiple embedding clusters, providing the set of semantically similar topic names to the generative AI model with additional instructions to generate a combined topic name for the multiple embedding clusters, and replacing the set of semantically similar topic names with the combined topic name in the set of topic names.

As further shown in FIG. 8, the series of acts 800 includes act 840 of mapping a topic name embedding of the topic name and first user event embeddings to the embedding space. For instance, in example implementations, act 840 involves mapping a topic name embedding of the topic name and first user event embeddings of first user events associated with a first user to the embedding space. In one or more implementations, act 840 includes identifying the first user events associated with the first user from the set of user events; generating, within the embedding space, the first user event embeddings using the first user events associated with the first user; and generating the topic name embedding within the embedding space for the topic name using the first user events associated with the first user.

As further shown in FIG. 8, the series of acts 800 includes act 850 of generating a user profile for the first user that includes the topic name based on determining a correlation between user event data and the topic name in the embedding space. For instance, in example implementations, act 850 involves generating a user profile for the first user that includes the topic name based on determining a correlation between the topic name and a subset of the first user events. In various implementations, act 850 includes determining the correlation between the topic name and the subset of the first user events based on embeddings for the subset of the first user events being within a topic assignment threshold of the topic name embedding within the embedding space.

In some instances, act 850 includes determining a user embedding that does not meet a topic assignment threshold for each topic name embedding mapped to the embedding space and discarding the user embedding for being associated with the user profile. In one or more implementations, act 850 includes providing access to the user profile of the first user to multiple applications that provide content. In some instances, act 850 includes generating a list of topic names for the first user based on the first user event text embeddings correlating to topic names on the list of topic names within the text embedding space.

In some implementations, act 850 includes ranking the topic names in the list of topic names based on user interest scores assigned to each topic name and selecting a subset of topic names to remain on the list of topic names based on ranking and/or the diversity (e.g., a measure of how semantically different the topics are from each other) of the list of topic names. In some implementations, ranking the topic names is based on topic interaction counts, topic interaction durations, and topic interaction uniqueness. In some instances, generating the user profile for the first user includes adding the subset of topic names to an additional taxonomy hierarchy level of topic names.

Figure 9:
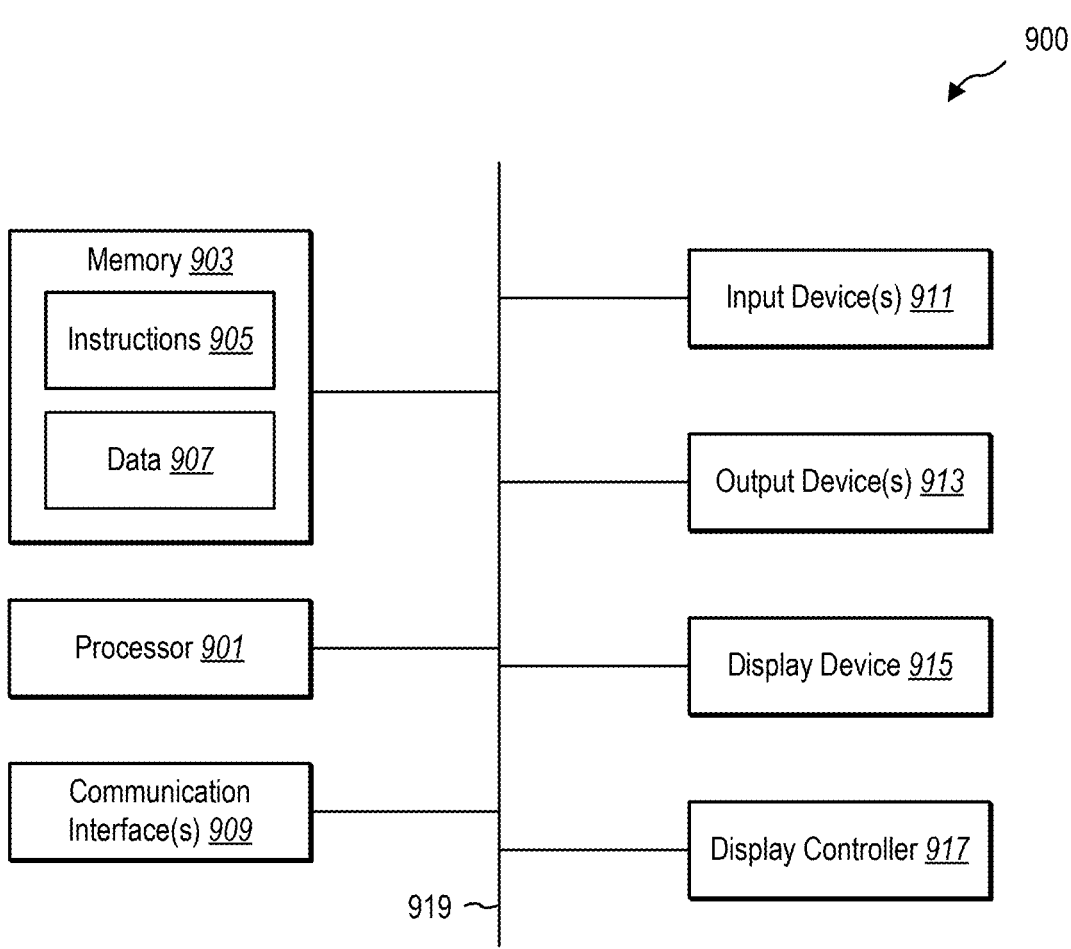
FIG. 9 illustrates example components included within a computer system for implementing a profile generation system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

This disclosure describes a subjective data application system in the framework of a network. In this disclosure, a "network" refers to one or more data links that enable electronic data transport between computer systems, modules, and other electronic devices. A network may include public networks such as the Internet as well as private networks. When information is transferred or provided over a network or another communication connection (either hardwired, wireless, or both), the computer correctly views the connection as a transmission medium. Transmission media can include a network and/or data links that carry required program code in the form of computer-executable instructions or data structures, which can be accessed by a general-purpose or special-purpose computer. Combinations of the above are also included within the scope of computer-readable media.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the various systems described in this disclosure. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for determining topic names from event data using one or more generative artificial intelligence (AI) models, comprising:

converting a set of user events with text labels into a set of embeddings in embedding space, wherein the set of embeddings is assigned the text labels corresponding to the set of user events;

based on determining a subset of embeddings within a first embedding cluster in the embedding space, identifying a subset of text labels that are assigned to the subset of embeddings;

providing a prompt to a generative AI model with prompt instructions to generate a topic name for the first embedding cluster based on the subset of text labels;

mapping a topic name embedding of the topic name and first user event embeddings of first user events associated with a first user to the embedding space; and based on determining a correlation between the topic name and a subset of the first user events, generating a user profile for the first user that includes the topic name.

2. The computer-implemented method of claim 1, further comprising using a text embedding neural network that maps input data into text embeddings within a text embedding space to create the set of embeddings from the set of user events, wherein the set of embeddings includes a set of text embeddings.

3. The computer-implemented method of claim 1, further comprising using a deep neural network to create the set of embeddings from the set of user events, wherein the deep neural network is a multimodal embedding network that converts data input of different data types into the embedding space.

4. The computer-implemented method of claim 1, further comprising:

identifying the set of user events from user event signal data based on interactions between user event data and a set of users that includes the first user;

determining that a first user event signal from the set of user events corresponds to multiple text labels; and selecting a first text label from the multiple text labels to associate with the first user event signal based on a text quality hierarchy.

5. The computer-implemented method of claim 1, further comprising generating a set of embedding clusters in the embedding space from the set of embeddings including generating the subset of embeddings into the first embedding cluster.

6. The computer-implemented method of claim 1, wherein identifying the subset of text labels assigned to the subset of embeddings includes selecting one or more of the text labels assigned to embeddings within the first embedding cluster based on a text quality hierarchy.

7. The computer-implemented method of claim 1, further comprising:

providing the subset of text labels to the generative AI model with the prompt, wherein the prompt instructions instruct the generative AI model to generate the topic name for the first embedding cluster based on the subset of text labels; and receiving the topic name for the first embedding cluster from the generative AI model.

8. The computer-implemented method of claim 1, further comprising:

providing a first additional prompt to the generative AI model with first additional instructions to generate a list of topic names without providing the subset of text labels; and providing a second additional prompt to the generative AI model with second additional instructions to generate an additional list of topic names from a previous list of topic names.

9. The computer-implemented method of claim 1, further comprising:

generating a set of topic names for a set of embedding clusters generated based on the set of embeddings; and deduplicating the set of topic names by removing semantically similar topic names.

10. The computer-implemented method of claim 9, further comprising:

identifying a set of semantically similar topic names from the set of topic names, where the set of semantically similar topic names corresponds to multiple embedding clusters;

providing the set of semantically similar topic names to the generative AI model with additional instructions to generate a combined topic name for the multiple embedding clusters; and replacing the set of semantically similar topic names with the combined topic name in the set of topic names.

11. The computer-implemented method of claim 1, further comprising:

identifying the first user events associated with the first user from the set of user events;

generating, within the embedding space, the first user event embeddings using the first user events associated with the first user; and generating the topic name embedding within the embedding space for the topic name using the first user events associated with the first user.

12. The computer-implemented method of claim 11, further comprising determining the correlation between the topic name and the subset of the first user events based on embeddings for the subset of the first user events being within a topic assignment threshold of the topic name embedding within the embedding space.

13. The computer-implemented method of claim 11, further comprising:

determining a user embedding that does not meet a topic assignment threshold for each topic name embedding mapped to the embedding space; and discarding the user embedding for being associated with the user profile.

14. The computer-implemented method of claim 1, further comprising providing access to the user profile of the first user to multiple applications that provide content.

15. A system comprising:

a processor; and a computer memory including instructions that, when executed by the processor, cause the system to carry out operations comprising:

identifying a set of user events with text labels corresponding to user interactions from a set of users that includes a first user;

converting the set of user events with the text labels into a set of text embeddings in text embedding space, wherein the set of text embeddings is assigned the text labels corresponding to the set of user events;

based on determining a subset of text embeddings within a first embedding cluster in the text embedding space, identifying a subset of text labels that are assigned to the subset of text embeddings;

providing a prompt to a generative AI model with prompt instructions to generate a topic name for the first embedding cluster based on the subset of text labels;

mapping a topic name text embedding of the topic name and first user event text embeddings of first user events associated with the first user to the text embedding space; and based on determining a correlation between the topic name and a subset of the first user events, generating a user profile for the first user that includes the topic name.

16. The system of claim 15, additional instructions that, when executed by the processor, cause the system to carry out operations comprising:

generating a topic description for the topic name using the generative AI model; and removing topic names from a generated list of topics that violate responsible safety and compliance policies.

17. The system of claim 15, additional instructions that, when executed by the processor, cause the system to carry out operations comprising:

generating a list of topic names for the first user based on the first user event text embeddings correlating to topic names on the list of topic names within the text embedding space;

ranking the topic names in the list of topic names based on user interest scores assigned to each topic name; and selecting a subset of topic names to remain on the list of topic names based on ranking and diversity of the list of topic names.

18. The system of claim 17, wherein ranking the topic names is based on topic interaction counts, topic interaction durations, and topic interaction uniqueness.

19. The system of claim 17, wherein generating the user profile for the first user includes adding the subset of topic names to an additional taxonomy hierarchy level of topic names.

20. A computer-implemented method for determining topic names for user event signals using one or more generative artificial intelligence (AI) models, comprising:

converting a set of user events with text labels into a set of text embeddings in text embedding space using a text embedding model, wherein the set of text embeddings is assigned the text labels corresponding to the set of user events;

based on determining a subset of text embeddings within a first embedding cluster in the text embedding space, identifying a subset of text labels that are assigned to the subset of text embeddings;

providing a prompt to a generative AI model with instructions to generate a topic name based on the subset of text labels;

mapping a topic name embedding of the topic name and first user event embeddings of first user events associated with a first user to the text embedding space; and based on determining a correlation between the topic name and a subset of the first user events, generating a user profile for the first user that includes the topic name.

* * * * *